Nov. 17, 1970 — W. N. CARSON, JR — 3,540,929

DEEP SUBMERGENCE RECHARGEABLE SEALED SECONDARY CELL

Filed May 5, 1969

Inventor:
William N. Carson, Jr.,
by Paul R. Webb, II
His Attorney.

United States Patent Office 3,540,929
Patented Nov. 17, 1970

3,540,929
DEEP SUBMERGENCE RECHARGEABLE
SEALED SECONDARY CELL
William N. Carson, Jr., Schenectady, N.Y., assignor to
General Electric Company, a corporation of New
York
Filed May 5, 1969, Ser. No. 821,702
Int. Cl. H01m 1/02, 1/08
U.S. Cl. 136—6                                    2 Claims

ABSTRACT OF THE DISCLOSURE

A rechargeable sealed secondary cell is described for operation with high ambient pressures which includes a flexible, pressure transmitting casing having positive and negative terminals, positive and negative plates within the casing electrically connected respectively to the positive and negative terminals, and an aqueous electrolyte impregnated separator between the plates. The cell has its void volume filled with a liquid to prevent serious deflection of the cell casing and permit recharging during exposure to high ambient pressures. This liquid, which exhibits a high solubility for molecular oxygen, is selected from the class consisting of fluorochloromethanes, fluorochloroethanes, fluorochloropropanes, and trifluorovinyl chloride polymer oil.

---

Figure 1:
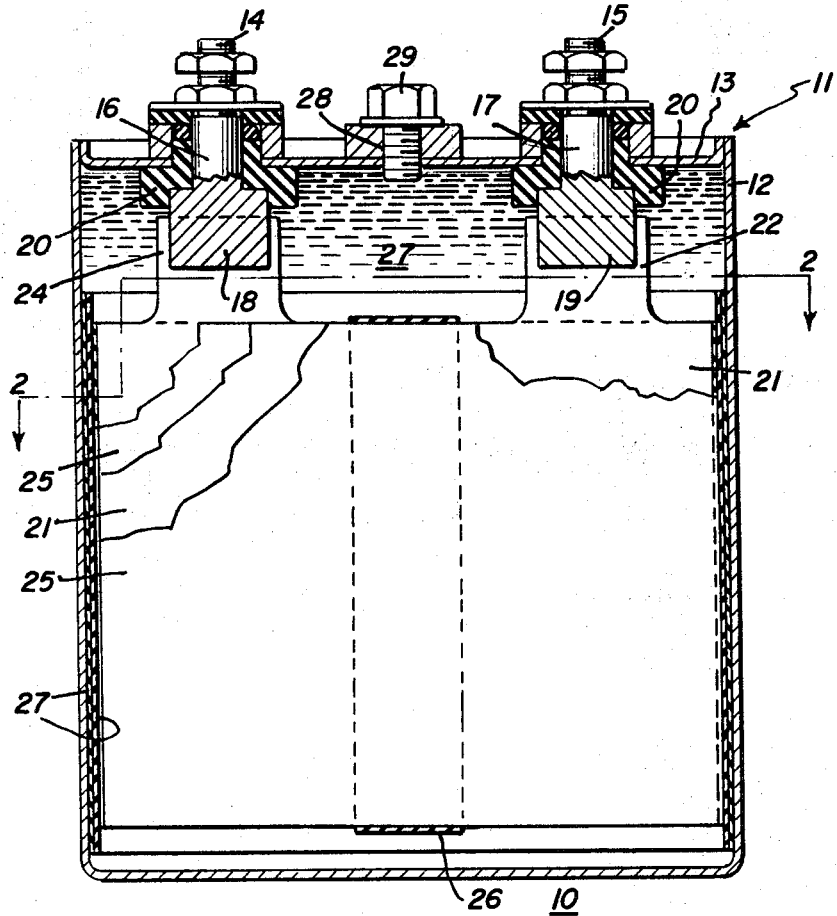

This invention relates to rechargeable sealed secondary cells and, more particularly, to such cells which are adapted for operation with high ambient pressures.

It is desirable to have a source of electrical energy available at a location lying beneath a considerable fluid head, such as on the floor of an ocean or in a well. A conventional rechargeable sealed secondary cell is unsuitable for use at great depths since the high pressures encountered would crush or collapse the cell casing, and disrupt and damage the operation of the cell. Solutions to this problem are to merely strengthen the casing or to provide an additional housing surrounding the casing to prevent pressure damage. However, such approaches are not desirable since they would result in an unduly heavy and expensive construction.

It has heretofore been suggested to provide batteries for deep submergence applications by employing a pressure equalization device for the cells, surrounding the cells within an exterior housing, and filling the housing with a conventional dielectric oil. Batteries of this type are described in U.S. Letters Patent 3,166,446—Hutchinson and 3,160,525—Hutchinson et al. Another modification which has been suggested previously is the attachment to the individual battery cells of a pressure equalization device. Such a battery is described in U.S. Letters Patent 3,208,884—Jensen. These previous batteries bear the common disadvantage in that they increase substantially the volume displacement of the battery since the pressure equalization devices are mounted externally of the cell casings and some of these cells are further contained within an external housing filled with oil to produce the battery structure.

My invention is directed to an improved rechargeable sealed secondary cell which eliminates the above problems of volume increase by including within the cell casing provision for pressure equalization and further provision for rechargability of the cell while exposed to high ambient pressures.

It is a primary object of my invention to provide a unique rechargeable sealed secondary cell containing within its housing provision for both pressure equalization and charging during submerged condition.

In accordance with one aspect of my invention, a rechargeable sealed secondary cell has a flexible, pressure transmitting casing with positive and negative plates connected electrically to respective positive and negative terminals, the respective plates having oxidizable and reducible materials which undergo reversible chemical reactions during the charge and discharge of the cell, an aqueous electrolyte impregnated separator between the plates, and a liquid exhibiting a high solubility for molecular oxygen filling the void volume of the casing, the liquid selected from the class consisting of fluorochloromethanes, fluorochloroethanes, fluorochloropropanes, and trifluorovinyl chloride polymer oil.

Figure 2:
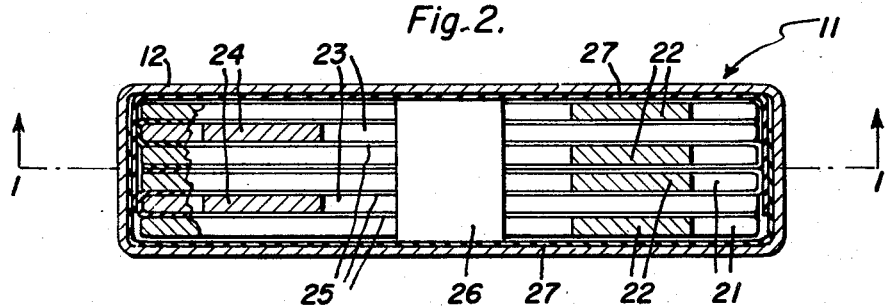

These and various other objects, features and advantages of the invention will be better understood from the following description taken in connection with the accompanying drawing in which:

FIG. 1 is a sectional view of a rechargeable sealed secondary cell made in accordance with my invention; and FIG. 2 is a sectional view of such cell taken along line 2—2 in FIG. 1.

In FIG. 1 of the drawing there is shown generally at 10 a rechargeable sealed secondary cell embodying my invention which has a casing 11 comprising an open-top casing portion 12 of generally rectangular configuration which may be made of electrically insulating material or metal. The open top of the housing portion 12 is sealed by a top wall 13 which may be made of electrically insulating material or metal. Top wall 13 carries a positive terminal 14 and a negative terminal 15. The terminals 14 and 15 have conductive portions 16 and 17 which extend through and below the top wall 13 and carry respective connecting tab portions 18 and 19. Since top wall 13 is shown as metal, the terminal structure includes an electrically insulating gasket 20 between wall 13 and each terminal 14 and 15. When the cell is employed in a liquid, a waterproof terminal connector (not shown) is installed on each of the terminals.

A negative plate 21 has a connecting tab 22 which is connected to tab 19 in any suitable manner. A positive plate 23 has a connecting tab 24 which is connected to tab 18 in any suitable manner. A separator 25 of a suitably chemically inert material, such as unwoven nylon fabric, is positioned between adjacent plates. Separator 25, which is best shown in FIG. 2, in the form of a tape, is preferably wound around the plate stack thereby positioning the separator material between the plates. A suitable alkaline electrolyte such as potassium hydroxide is impregnated into the separator battery thereby placing adjacent negative and positive plates in electrolytic connection. A binding strip 26 of electrically insulating material is preferably used to hold the plates and the separator within a minimum volume.

A two-piece electrically insulating plastic cell liner 27 surrounds the plates, separator material and binding strip whereby these components are held in a compact arrangement and are electrically insulated from metal casing portion 12. It will, of course, be appreciated that if the casing portion is made of an electrically insulating material, such plastic liner can be dispensed with. A liquid 27 exhibiting a high solubility for molecular oxygen is introduced into the casing through an aperture 28 in top wall 13 to fill the void volume within casing portion 12. The liquid is selected from the class consisting of fluoromethanes, fluoroethanes, fluoropropanes, and trifluorovinyl chloride polymer oil. A vent cap 29 closes aperture 28 thereby providing a sealed or non-vented cell.

It is preferred that the rechargeable sealed secondary cell be a nickel-cadmium cell. Such a cell in its discharged state has a negative plate comprising cadmium hydroxide impregnated into a suitable plate substrate and a positive plate comprising divalent nickel hydroxide impregnated in a similar manner in a suitable plate substrate.

I discovered unexpectedly that I could form a rechargeable sealed secondary cell, which cell could be subjected to great pressure, such as submergence in a fluid to a great depth, without damage to the cell. Secondly, I found unexpectedly that such a cell could be charged and recharged in its submerged condition. I found further that such a structure could be formed within a conventional size cell casing without increasing the cell volume. These unexpected results are accomplished by filling the void volume of the casing portion with a liquid which exhibits a high solubility for molecular oxygen. Such a liquid is selected from the class consisting of fluorochloromethanes, fluorochloroethanes, fluorochloropropanes, and trifluorovinyl chloride polymer oil. The fluorochloromethanes, fluorochloroethanes and fluorochloropropanes are commercially available, for example, under the name Freon fluorinated hydrocarbons, which are produced by E. I. du Pont de Nemours and Company, Inc., Wilmington, Del. The trifluorovinyl chloride polymer oil is commercially available, for example, under the name Fluorolubes oils, which are produced by Hooker Chemical Corporation, Niagara Falls, N.Y.

Previously, cells which were employed for operation with high ambient pressures, such as submergence at great pressures, required exterior pressure equalization devices. Such cells employed also an exterior housing, and a dielectric oil between the cells and the exterior housing. These previous cells could not be recharged in a submerged condition since oxygen gas generated during recharging has to be vented to the atmosphere. I found that with my unique cell construction I could accomplish both the pressure equalization within the original volume of the cell and provide recharging in a submerged condition.

I found that a cell such as a conventional nickel-cadmium cell could be employed if the casing of the cell was of flexible, pressure transmitting material such as nickel plated steel. Frequently, such materials are employed for the casing of these types of cells. Secondly, I have found that with the employment of the above-described liquid exhibiting a high solubility for molecular oxygen filling the void space within the casing that the amount of deflection by external pressure against the casing is sufficiently small to prevent any irreversible deformation of the casing.

When such a conventional cell is to be charged or recharged, it is provided with a vent for the venting of oxygen to the atmosphere. If the cell is sealed, provision must be made in the charging cycle of the cell to prevent an extensive buildup of oxygen pressure within the casing. As it is mentioned above, the present practice for recharging a submergable cell is transport it to the water surface, to open an appropriate gas outlet vent, and to charge the cell on the water surface so that the oxygen is vented to the atmosphere.

I found that the use of the above-described liquids exhibiting high solubilities for molecular oxygen filling the voids of the casing provided a material which did not interfere with the operation of the cell. In this manner, I found that my unique cell could be charged and discharged in a submerged condition in a manner analogous to conventional sealed cells employing an oxygen cycle on overcharge.

An illustrative operation of a rechargeable sealed secondary cell comprises the assembly of a nickel-cadmium rechargeable sealed secondary cell which includes a casing portion of nickel-plated steel to provide a flexible, pressure transmitting casing material. Trifluorovinyl chloride polymer oil was introduced into the casing portion through the aperture in its top wall to fill the void volume within the casing. A vent cap was then provided to close and seal the aperture. An appropriate lead was attached to each of the respective terminals on the exterior surface of the cell casing.

The cell is then constrained by clamping to exert a pressure against the exterior surface of the casing. A power source is then connected across the leads thereby charging the cell while in a sealed and constrained condition. During the charge cycle of the cell, oxygen dissolves in the oil. The cell is discharged by applying a load across the leads. During the discharge cycle of the cell, oxygen is recombined. The oxygen is dissolved in the oil and is recombined at a satisfactory rate to show that oxygen recombination is functioning satisfactorily.

An example of a conventional rechargeable sealed secondary cell is set forth below:

EXAMPLE 1

A nickel-cadmium rechargeable sealed secondary cell was formed as described above and is shown in FIGS. 1 and 2 of the drawing. A rectangular nickel-plated stainless steel casing was provided with a 0.015 inch thick wall and bottom portion, and a 0.060 inch thick top portion to provide rigidity for the terminal seals. Each positive plate was impregnated with divalent nickel hydroxide while each negative plate was impregnated with cadmium hydroxide. Prior to sealing of the cell, the negative plate was precharged 50% (0.9 amp hour).

The plate pack consisted of 7 negative plates and 6 positive plates. The nominal cell capacity was 4.0 ampere hours with a negative capacity of 5.7 ampere hours and a positive capacity of 4.3 ampere hours. The excess of ampere hours for the negative plate is used to prevent hydrogen evolution during charging of the cell. The interleaved plates were separated by an unwoven nylon fabric strip of 8 mils thickness which wa compressed to 5 mils thickness in assembling the plate pack. The separator was impregnated with an alkaline electrolyte solution of 31 percent potassium hydroxide which contained potassium carbonate of less than 1 to 2 grams per liter. 4.7 cc. of electrolyte was added for each ampere hour for a total of 18.8 cc. No free electrolyte was left remaining in the cell. A binding strip of unwoven nylon was used to hold the plate pack together. The plate pack was inserted in an electrically insulated plastic cell liner after which it was positioned in the casing. Nylon washers of the compression type were employed at both terminals to provide a sealed cell. A fill tube was attached to the aperture in the top portion of the cell and provided with both a valve and a pressure gauge. The cell was evacuated prior to closing the valve thereby producing a sealed cell.

This cell was then operated without any external constraint whereby there was no ambient pressure applied against the casing exterior. The cell was charged at 400 milliamperes for 10 hours after which the cell was discharged at 400 mlliamperes for 8 hours. A 6 hour interval was then provided prior to the next charge. The cell was run for 5 cycles under the above conditions at room temperature. The initial internal pressure was 29 inches of mercury while the maximum pressure during operation was 5 inches of mercury.

An example of a rechargeable sealed secondary cell made in accordance with my invention is set forth below:

EXAMPLE 2

A nickel-cadmium rechargeable sealed secondary cell was formed in the same manner as described above in Example 1. However, prior to closing the valve on the fill tube connected to the cell, the cell had all but about 0.2 cc. of 30 cc. of its void spaces filled with trifluorovinyl chloride polymer oil. The cell was then constrained by being placed in a clamp to provide pressure against the external cell casing. The initial pressure in the cell was 5 pounds per square inch due to its constrained condition. This cell was charged at 100 milliamperes for 40 hours and then discharged at 400 milliamperes for 8 hours during 5 consecutive cycles without any intervening time period between each cycle. The pressure remained the same during these 5 cycles.

The cell was then charged at 200 milliamperes for 20 hours and discharged at 400 milliamperes for 8 hours for 5 cycles without an intervening time period between cycles. The initial pressure was 5 pounds per square inch while the maximum pressure was 10 pounds per square inch. Both the first and second sets of cycles were accomplished at room temperature.

A third set of 20 cycles of this cell was done at room temperature with the cell being charged at 400 milliamperes for 10 hours and then discharged at 400 milliamperes for the same time period without an intervening time period between cycles. The initial pressure was 5 pounds per square inch while the maximum pressure was 25 pounds per square inch.

This example shows that the above cell made in accordance with the present invention whereby liquid exhibiting a high solubility for molecular oxygen filled the void volume of the casing had a satisfactory oxygen recombination cycle. This example demonstrated that the oxygen dissolved in the oil during charging of the cell and was recombined during discharge of the cell at a satisfactory rate so that the cell could be operated in a sealed condition and subjected to external pressure.

While other modifications of the invention and variations thereof which may be employed within the scope of this invention have not been described, the invention is intended to include such as may be embraced within the following claims:

What I claim as new and desire to secure by Letters Patent of the United States is:

1. In a rechargeable sealed secondary cell including a flexible, pressure transmitting casing having positive and negative terminals, positive and negative plates within said casing electrically connected respectively to said positive and negative terminals, said plates having respectively oxidizable and reducible materials which undergo reversible chemical reactions during the charge and discharge of the battery, and an aqueous electrolyte impregnated separator between said plates, the improvement in combination therewith comprising a liquid exhibiting a high solubility for molecular oxygen filling the void volume of the casng, said liquid selected from the class consisting of fluorochloromethanes. fluorochloroethanes, fluorochloropropanes, and trifluorovinyl chloride polymer oil.

2. In a rechargeable sealed secondary cell as in claim 1, in which the plates in discharged state have divalent nickel hydroxide and cadmium hydroxide as the respective oxidizable and reducible materials.

References Cited
UNITED STATES PATENTS

| | | | |
|---|---|---|---|
| 3,160,525 | 12/1964 | Hutchison et al. | 136—166 XR |
| 3,208,884 | 9/1965 | Jensen | 136—6 XR |
| 3,391,029 | 7/1968 | Orsino | 136—178 XR |

DONALD L. WALTON, Primary Examiner

U.S. Cl. X.R.

136—166, 179